Figure 1:
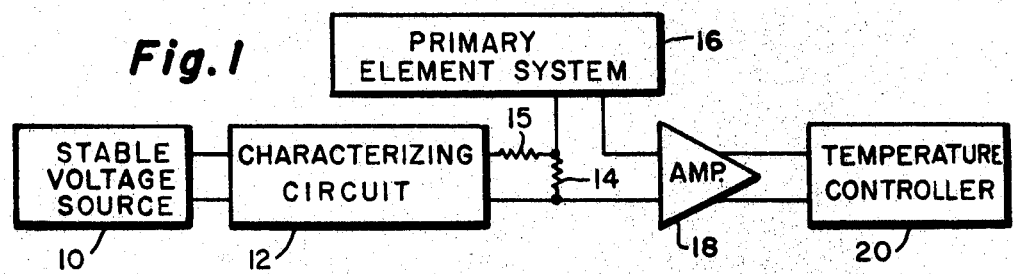

July 25, 1967  L. H. GAUSS, JR., ET AL  3,333,181
POTENTIOMETER OUTPUT VOLTAGE CHARACTERIZING CIRCUIT
Filed Sept. 12, 1963  2 Sheets-Sheet 1

INVENTORS
Louis H. Gauss, Jr., Harry L. Latham, Jr.
BY
Clarence R. Bailey, Jr.

ATTORNEY

INVENTORS
Louis H. Gauss, Jr., Harry L. Latham, Jr.
BY
*Clarence R. Patty, J.*
ATTORNEY United States Patent Office 3,333,181
Patented July 25, 1967

3,333,181
POTENTIOMETER OUTPUT VOLTAGE
CHARACTERIZING CIRCUIT
Louis H. Gauss, Jr., Levittown, and Harry L. Latham, Jr., Philadelphia, Pa., assignors, by mesne assignments, to Robertshaw Controls Company, Richmond, Va., a corporation of Delaware
Filed Sept. 12, 1963, Ser. No. 308,525
16 Claims. (Cl. 323—17)

This invention relates to characterizing circuits and more particularly to electrical circuits, by means of which the output from a linear potentiometer is made selectively non-linear, but is in no way limited to such applications.

A characterizing circuit may be defined as one which causes an otherwise linear output from an electrical device to be selectively non-linear.

In many processes it is desired to control a variable parameter such as quantity, temperature, pressure, and the like. To control these variables, a primary element such as a thermocouple, radiation pyrometer, level sensor, transducer, thermistor, tachometer, or the like is used to sense the condition or value of said variables and thereafter provide a corresponding electrical signal to a suitable controller. The controller, through suitable circuitry, controls the process to cause said variable to reach and remain at some predetermined or preset value thereof. For simplicity, the instant invention will be described with reference to a process wherein said variable parameter is temperature, which temperature is sensed by a thermocouple. Circuit means suitable for such purposes embody a potentiometer within the circuitry thereof as a means for adjusting or presetting a desired value of temperature. Most common primary elements, including thermocouples, provide a non-linear output voltage as function of said variable parameter. Since temperature is preset by a potentiometer with a linear output, it is desirable to characterize said linear output to make it selectively non-linear corresponding to the non-linearity of the output of said thermocouple thereby permitting temperature to be preset to any desired value by employing a simple linear digital dial in conjunction with said potentiometer.

In the past, one method of obtaining a non-linear output from a linear potentiometer was to provide a series of taps about a potentiometer winding, across pairs of which taps shunt resistors of varying resistance values were connected to provide an approximation of some desired non-linearity. The output of such a device would be linear for potentiometer wiper positions between said taps, however, the overall characteristics thereof would be non-linear resulting from the incremental addition of the varying shunt resistances. Another prior art method for obtaining a non-linear output from a potentiometer required winding of the potentiometer with a resistance wire having varying resistivity. An example of a wire having varying resistivity would be a resistance wire having a varying diameter. The output from such a potentiometer would be non-linear corresponding to the variation in the wire resistance. Such prior art means for obtaining a non-linear output from a potentiometer were not only very costly but could not be adapted to economic and rapid circuit changes corresponding to changes in desired non-linearity characteristics, primary elements, variable range, and the like. Such prior art potentiometers were made precisely for use with a specific primary element to obtain preselected non-linear characteristics within a preselected range. When changes were desired, this costly potentiometer had to be replaced.

It is an object of this invention to overcome the heretofore noted disadvantages and difficulties and to provide an inexpensive and precise means for potentiometer output voltage characterization.

Another object of this invention is to provide an improved electrical circuit having an output voltage of predetermined non-linearity.

Still another object is to provide improved means for obtaining a non-linear output from a potentiometer.

A further object is to provide an electrical circuit means having an output voltage of predetermined non-linearity, wherein said means are adapted to economic and rapid changes corresponding to changes in desired non-linearity characteristics, variable range, and primary elements.

According to the present invention a characterizing circuit is provided comprising a transistor having emitter, collector, and base electrodes; means electrically connected to said emitter electrode to provide a source of electrical energy thereto; means, embodying a potentiometer, electrically connected to the input and output terminals of said circuit for direct passage of first electrical energy from the input terminals to the output terminals, said last-mentioned means also being connected to said base electrode to provide a variable bias therefor, whereby the output from said collector electrode, comprising second electrical energy, is combined with said first electrical energy to provide a characterized voltage at the output terminals to said circuit.

Additional objects, features, and advantages of the present invention will become apparent to those skilled in the art, from the following detailed description and the attached drawings, on which, by way of example, only the preferred embodiments of the invention are illustrated.

FIGURE 1 is a block diagram illustrating the circuit of the instant invention connected to associated circuitry.

Figure 2:
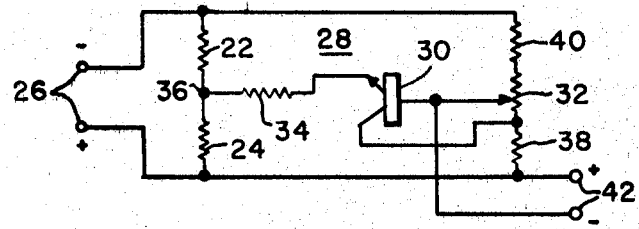
Figure 4:
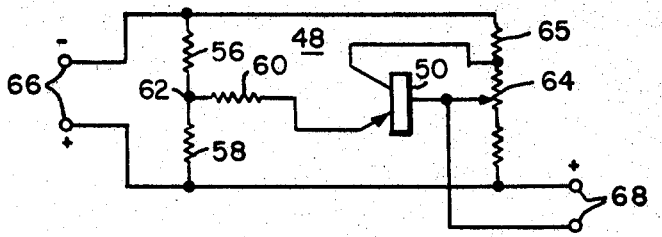
Figure 6:
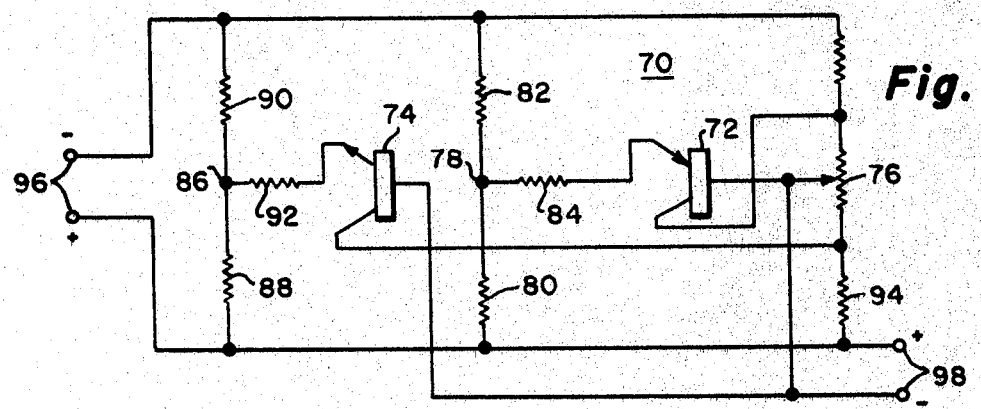

FIGURES 2, 4, and 6 are schematic diagrams illustrating various embodiments of the instant invention.

Figure 3:
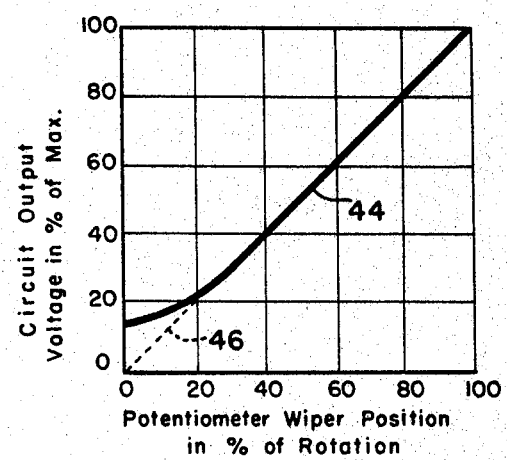
Figure 5:
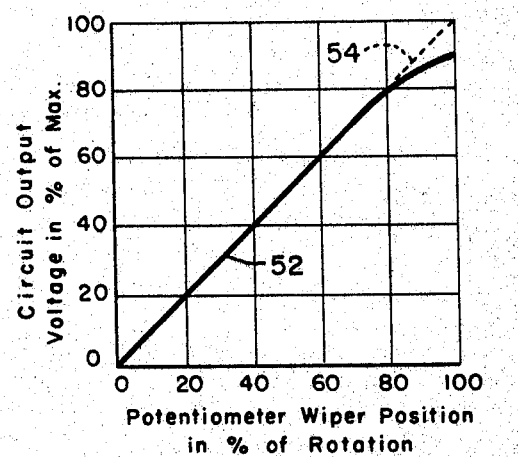
Figure 7:
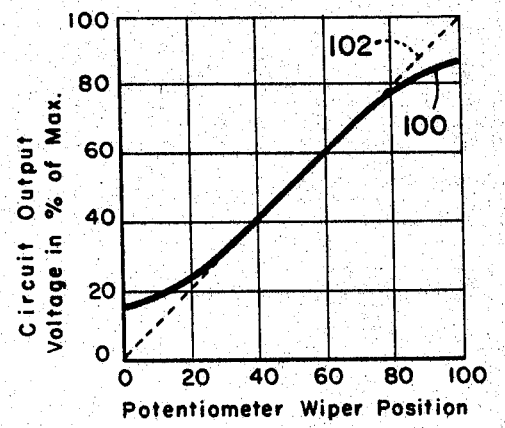

FIGURES 3, 5, and 7 are graphs illustrating non-linear outputs from the circuits of FIGURES 2, 4, and 6 respectively as a function of the potentiometer wiper position.

Referring now to FIGURE 1 of the drawings, it is seen that a stable voltage source 10, such as a battery, regulated power supply, or the like, is electrically connected to the input terminals of characterizing circuit 12 of the instant invention. A voltage divider, comprising resistors 14 and 15, in conjunction with a primary element system 16, such as a thermocouple, or the like, are connected across the output terminals of said characterizing circuit. The output signal from circuit 12 is balanced against a signal from the primary element system 16 across resistor 14 to provide a difference signal, corresponding to the deviation from the desired value of temperature as preset by means embodied within said circuit 12, to the input terminals of amplifier 18 and in turn to the input terminals of temperature controller 20. Temperature controller 20 thereafter controls temperature by any one of various methods well known in the art.

Referring now to FIGURE 2, it is seen that a voltage divider comprising resistors 22 and 24 is electrically connected across the input terminals 26 of circuit 28. Circuit 28 includes transistor 30 and linear potentiometer 32. Voltage dropping resistor 34, or other impedance when desired, is connected to an intermediate point 36 of said voltage divider in series with the emitter electrode of transistor 30. The base electrode of the transistor 30 is connected to the wiper of potentiometer 32. Potentiometer 32 in connected intermediate voltage dropping resistors 38 and 40, or other impedances, across input terminals 26. The collector electrode of transistor 30 is connected intermediate potentiometer 32 and resistor 38. The wiper arm of potentiometer 32 together with the output from said potentiometer through resistor 38, comprise the output terminals 42 of circuit 28.

Transistor 30 of circuit 28 is illustrated as an NPN type. When a signal, of correct polarity, as illustrated in FIGURE 2, from a suitable stable voltage source, as hereinbefore described, is impressed upon terminals 26, electrical current will flow through resistor 40 and potentiometer 32 to terminals 42. Current flow through transistor 30 depends on its base electrode current and in turn on the amount of the potentiometer resistance that is placed in the circuit. When the potential of the potentiometer wiper arm, and in turn the base of transistor 30, is at a level higher than or negative with respect to the potential of voltage divider intermediate point 36, current will not be conducted through transistor 30, since in this condition the base-emitter junction will be reverse biased. In this condition of circuit 28, all current flow will be directly through potentiometer 32 resulting in a linear output at terminals 42 as illustrated by the upper linear portion of line 44 of FIGURE 3. When the potential of the base electrode of transistor 30 falls below that of or is positive with respect to intermediate point 36, transistor 30 will begin to conduct. The current flowing through transistor 30 will combine with the current flowing through potentiometer 32 and resistor 38 to provide a non-linear output from circuit 28 as illustrated by the curved lower portion of line 44 of FIGURE 3. Broken line 46 illustrates the linear output of an uncharacterized circuit. It is readily seen that in addition to the position of the wiper arm of potentiometer 32, the potential at intermediate point 36 and the value of resistor 38 are the most significant influences on the characterization of the circuit output. It should be noted that voltage dropping resistor 34 may be omitted by suitably selecting resistors 22 and 24, so that this potential divider provides a source impedance to the emitter current flow whereby the potential at point 36 is that desired as the potential of the emitter electrode of transistor 30 thereby resulting in the desired degree of characterization. Further, resistor 40 may be omitted when no upper limit characterization is required, as illustrated in FIGURE 3.

FIGURE 4 illustrates another embodiment of this invention wherein circuit 48 is identical with circuit 28 of FIGURE 2 except PNP type transistor 50 replaces NPN type transistor 30, and the collector electrode of transistor 50 is connected intermediate potentiometer 64 and voltage dropping resistor 65. The output from such a circuit results in a characterizing curve as illustrated by line 52 of FIGURE 5. A linear output of an uncharacterized circuit is illustrated by broken line 54 in FIGURE 5. Resistors 56 and 58 comprises the voltage divider of circuit 48 and voltage dropping resistor 60 is connected to the intermediate point 62 thereof in series with the emitter electrode of transistor 50. The base of transistor 50 is biased through the wiper arm of potentiometer 64. The input and output terminals of circuit 48 are indicated by numerals 66 and 68 respectively. Current is conducted through transistor 50 when the potential of the base electrode thereof exceeds the potential at intermediate point 62. The modifications heretofore suggested to circuit 28 of FIGURE 2 may also be made to circuit 48.

FIGURE 6 illustrates still another embodiment of this invention. Circuit 70 comprises PNP type transistor 72 and NPN type transistor 74 in conjunction with potentiometer 76. The emitter electrode of transistor 72 is connected to the intermediate point 78 of its voltage divider, comprising resistors 80 and 82, through voltage dropping resistor 84, while the emitter electrode of transistor 74 is connected to the intermediate point 86 of its voltage divider, comprising resistors 88 and 90, through its voltage dropping resistor 92. The collector electrode of transistor 72 is connected ahead of potentiometer 76 and the collector electrode of transistor 74 is connected intermediate potentiometer 76 and resistor 94 for passage of current through voltage dropping resistor 94 to one output terminal of circuit 70. The base electrodes of both transistors are connected to the wiper of potentiometer 76 and in turn to the other output terminal of circuit 70. The input and output terminals of circuit 70 are designated by numerals 96 and 98, respectively. As an electrical signal is applied to input terminals 96, first one transistor will conduct electrical current, depending on the potential applied to its base electrode, and then the other transistor will conduct resulting in an output from the circuit as illustrated by line 100 of FIGURE 7. A linear output of an uncharacterized circuit is illustrated by broken line 102 in FIGURE 7.

It is readily seen that by a proper combination of transistors, voltage dropping resistors, input potential, and potentiometer resistance, substantially any non-linear output from a primary element may be reproduced at the output of the characterizing circuit of this invention. It is also readily seen that by replacing NPN type transistors shown with PNP type transistors and replacing PNP type transistors shown with NPN type transistors and by reversing the source polarities as shown in FIGS. 2, 4 and 6, the characterized output will be as described and illustrated in FIGS. 3, 5 and 7 except that the output polarities will be reversed.

Solely by way of example, a circuit according to FIGURE 1, provided a characterized output therefrom as illustrated in FIGURE 2 when constructed with the following values of circuit elements.

| Resistor 22 | ohms | 5065 |
| --- | --- | --- |
| Resistor 24 | do | 7715 |
| Resistor 32 | do | 950 |
| Resistor 34 | do | 0 |
| Resistor 38 | do | 429 |
| Resistor 40 | do | 0 |
| Transistor 30 | | 2N697 |

Such a circuit is suitable for use with a platinum-platinum 10 percent rhodium thermocouple through a temperature range from 650° C. to 1650° C.

Although the present invention has been described with respect to specific details of certain embodiments thereof, it is not intended that such details be limitations upon the scope of the invention except insofar as set forth in the following claims.

We claim:
1. A voltage characteristic circuit for operation from a D.C. voltage source comprising
  (a) two input terminals and two output terminals, one of said input terminals being electrically the same as one of said output terminals, said input terminals providing connections to a D.C. voltage source,
  (b) a transistor having emitter, collector, and base electrodes,
  (c) a voltage divider connected across said input terminals and having a connecting point intermediate said input terminals,
  (d) means electrically connecting said emitter electrode to said connecting point,
  (e) a circuit portion connected across said input terminals, said portion including a potentiometer having an adjustable terminal which is connected to the other of said output terminals and to said base electrode, and said circuit portion providing a point intermediate said input terminals to which said collector electrode is connected whereby the voltage at said output terminals is a function of the position of said adjustable terminal and current flow in said circuit portion including the current flow of said collector electrode.

2. The circuit of claim 1 wherein said means electrically connecting said emitter electrode to said connecting point includes a resistor.

3. The circuit of claim 1 wherein said transistor is an NPN transistor.

4. The circuit of claim 1 wherein said transistor is an NPN transistor and the point of said circuit portion to which said collector electrode is connected is intermediate said adjustable terminal and said one of said output terminals.

5. The circuit of claim 1 wherein said transistor is a PNP transistor.

6. The circuit of claim 1 wherein said transistor is a PNP transistor and the point of said circuit portion to which said collector electrode is connected is intermediate said adjustable terminal and said other of said output terminals.

7. The circuit of claim 1 wherein said circuit portion also includes an impedance connected between one end of said potentiometer and one of said input terminals, said one end of said potentiometer providing said point intermediate said input terminals to which said collector electrode is connected.

8. A voltage characterizing circuit for operation from a D.C. voltage source comprising
   (a) two input terminals and two output terminals, one of said input terminals being electrically the same as one of said output terminals, said input terminals providing connections to a D.C. voltage source,
   (b) a plurality of transistors, each having emitter, collector and base electrodes,
   (c) voltage divider means connected across said input terminals and having plurality of connecting points intermediate said input terminals,
   (d) means electrically connecting each of said emitter electrodes to a different one of said plurality of connecting points,
   (e) a circuit portion connected across said input terminals, said portion including a potentiometer having an adjustable terminal which is connected to the other of said output terminals and to each of said base electrodes, and each of said collector electrodes connected to said circuit portion intermediate said input terminals whereby the voltage at said output terminals is a function of the position of said adjustable terminal and current flow in said circuit portion including the current flow of each of said collector electrodes.

9. The circuit of claim 8 wherein at least one of said transistors is a PNP transistor.

10. The circuit of claim 8 wherein at least one of said transistors is a PNP transistor with its collector electrode connected to said circuit portion at a point intermediate said adjustable terminal and said other of said output terminals.

11. The circuit of claim 8 wherein at least one of said transistors is an NPN transistor.

12. The circuit of claim 8 wherein at least one of said transistors is an NPN transistor with its collector electrode connected to said circuit portion at a point intermediate said adjustable terminal and said one of said output terminals.

13. The circuit of claim 8 wherein at least one of said transistors is a PNP transistor with its collector electrode connected to said circuit portion at a point intermediate said adjustable terminal and said other of said output terminals and at least one of said transistors is an NPN transistor with its collector electrode connected to said circuit portion at a point intermediate said adjustable terminal and said one of said output terminals.

14. The circuit of claim 8 wherein said voltage divider means includes a plurality of voltage dividers, each providing one of said plurality of connecting points.

15. The circuit of claim 8 wherein said means electrically connecting each of said emitter electrodes to a different one of said plurality of connecting points includes a plurality of resistors, one for each of said emitter electrodes.

16. A voltage characterizing circuit for operation from a D.C. voltage source comprising
   (a) two input terminals and two output terminals, one of said input terminals being electrically the same as one of said output terminals, said input terminals providing connections to a D.C. voltage source,
   (b) two transistors, each having emitter, collector and base electrodes, one of said transistors being an NPN transistor and the other of said transistors being a PNP transistor,
   (c) voltage divider means connected across said input terminals and having two connecting points intermediate said input terminals,
   (d) means electrically connecting each of said emitter electrodes to a different one of said two connecting points,
   (e) a circuit portion connected across said input terminals, said portion including a potentiometer having an adjustable terminal which is connected to the other of said output terminals and to each of said base electrodes, said circuit portion including a first impedance connected between one end of said potentiometer and said one of said input terminals and a second impedance connected between the other end of said potentiometer and the other of said output terminals, said first impedance providing a point to which the collector electrode of said NPN transistor is connected and said second impedance providing a point to which the collector electrode of said PNP transistor is connected whereby the voltage at said output terminals is a function of the position of said adjustable terminal and current flow in said circuit portion including the current flow of each of said collector electrodes.

References Cited

UNITED STATES PATENTS

| | | | |
|---|---|---|---|
| 2,751,550 | 6/1956 | Chase | 323—66 |
| 3,083,328 | 3/1963 | Mallery | 321—16 |
| 3,227,942 | 1/1966 | Bunch | 323—22 |
| 3,233,167 | 2/1966 | Marlow | 323—65 |

JOHN F. COUCH, *Primary Examiner.*

K. D. MOORE, A. D. PELLINEN, *Assistant Examiners.*